(12) United States Patent
Shiraishi et al.

(10) Patent No.: US 10,203,947 B2
(45) Date of Patent: Feb. 12, 2019

(54) EFFICIENT OVER-THE-AIR SOFTWARE UPDATE FOR A CONNECTED VEHICLE

(71) Applicants: Toyota InfoTechnology Center USA, Inc., Mountain View, CA (US); DENSO CORPORATION, Kariya-shi, Aichi-ken (JP); Runtime Verification Inc., Urbana, IL (US)

(72) Inventors: Shinichi Shiraishi, Mountain View, CA (US); Grigore Rosu, Champaign, IL (US); Philip Daian, Great Neck, NY (US); Akihito Iwai, Kariya (JP); Yuki Mae, Kariya (JP)

( * ) Notice: Subject to any disclaimer, the term of this patent is extended or adjusted under 35 U.S.C. 154(b) by 63 days.

(21) Appl. No.: 15/227,413

(22) Filed: Aug. 3, 2016

(65) Prior Publication Data

US 2018/0039489 A1 Feb. 8, 2018

(51) Int. Cl.
G06F 9/44 (2018.01)
G06F 8/65 (2018.01)
G06F 11/30 (2006.01)
G06F 9/455 (2018.01)

(52) U.S. Cl.
CPC .............. G06F 8/65 (2013.01); G06F 11/302 (2013.01); G06F 11/3055 (2013.01); G06F 9/45504 (2013.01)

(58) Field of Classification Search
CPC ...... G06F 8/65; G06F 11/302; G06F 11/3055; G06F 9/45504
USPC ....................................................... 717/171
See application file for complete search history.

(56) References Cited

U.S. PATENT DOCUMENTS

| 2005/0204344 A1* | 9/2005 | Shinomi | G06F 8/316 717/124 |
| 2008/0177554 A1* | 7/2008 | Srinivasan | G06F 8/76 717/100 |
| 2009/0292453 A1* | 11/2009 | Dietz | F02D 41/042 701/112 |
| 2010/0146505 A1* | 6/2010 | Almonte | G06F 9/4443 718/1 |
| 2010/0179720 A1* | 7/2010 | Lin | G07C 5/008 701/31.4 |
| 2015/0052619 A1* | 2/2015 | Kwak | G06F 21/6245 726/28 |

* cited by examiner

*Primary Examiner* — Anna C Deng
(74) *Attorney, Agent, or Firm* — Burbage Law, P.C.; Jon-Michael Burbage; Elizabeth Ruzich

(57) ABSTRACT

The disclosure includes a system and method for providing a wireless software update for a connected vehicle. The connected vehicle includes a processor, an engine, a battery, a non-transitory memory storing a vehicle application and a wireless antenna that is powered by the battery and operable to receive a monitor module from a wireless network while the battery is not being charged. The processor is communicatively coupled to the battery, the wireless antenna and the non-transitory memory. The monitor module is written in an aspect language and includes a software patch for the vehicle application. The wireless antenna receives the monitor module from the wireless network while leaving a sufficient charge in the battery to enable the battery to start the engine. The processor installs the monitor module in the vehicle application stored in the non-transitory memory. Installation of the monitor module provides the software patch for the vehicle application.

19 Claims, 5 Drawing Sheets

EFFICIENT OVER-THE-AIR SOFTWARE UPDATE FOR A CONNECTED VEHICLE

CROSS REFERENCE

This application is related to U.S. patent application Ser. No. 14/939,625 filed on Nov. 12, 2015 and entitled "Application Assurance for Open Platform In-Vehicle Infotainment System," the entirety of which is hereby incorporated by reference.

BACKGROUND

The specification relates to an efficient over-the-air software update for a connected vehicle.

Modern vehicles include software running onboard. Unfortunately, it is hard to identify all the bugs and vulnerability problems in the vehicle software before the vehicles are first sold to the public. Once a software problem is found in the field, the cost of fixing the problem is expensive. One of the reasons for this expense is that a large portion of software is commonly used among many different types of vehicles from the same original equipment manufacturer ("OEM") and, so, the recall should be fleet-wide. The software problem may be resolved by a software update.

SUMMARY

Connected vehicles include software that may be updated from time to time. These updates may be provided via a software patch that is wirelessly transmitted to the connected vehicles via a wireless network. Connected vehicles that rely on only combustion engines have a small battery capacity relative to electrical vehicles and hybrid vehicles. Software patches may have a large file size (e.g., 10 kilobytes, 700 kilobytes, 1 gigabyte, etc.). Connected vehicles that rely on only combustion engines may drain their battery by wirelessly downloading a software patch from the wireless network. If the battery is too depleted by downloading the software patch, then the battery may include insufficient charge to start the combustion engine the next time the connected vehicle is desired to be driven by an operator. The monitor module described herein solves this problem.

The monitor module may include a software patch for updating a vehicle application installed in the connected vehicle. The vehicle application may include software for a vehicle system. The vehicle system may include any vehicle system that includes a software element. For example, the vehicle system may include a vehicle infotainment system, a vehicle navigation system, an advanced driver assistance system, an engine control unit, a system for providing automated or semi-automated driving for the connected vehicle, etc.

The software patch included in the monitor module may update the object code of the vehicle application. The monitor module itself may be the software patch. The monitor module may be written in an aspect-oriented programming language (i.e., an aspect language). Software written in aspect languages are smaller in size due to being written in the aspect language. Accordingly, connected vehicles may download the monitor module without draining their battery to the point of having insufficient charge to start their engine due to the small file size of the monitor module. For example, the monitor module may have a file size that is substantially 1 byte to substantially 9 kilobytes. In another example, the monitor module may have a file size that is substantially 1 byte to substantially 999,999 kilobytes. The size of the monitor module may be variable and configured based on the size of the engine of the connected vehicle so that the battery of the connected vehicle has sufficient charge to start the connected vehicle after downloading and installing the monitor module. For example, a four-cylinder engine may require 130 to 150 amps at 9.6 to 11 volts; the size of the monitor module may be configured so that it may be downloaded and installed in the connected vehicle while leaving sufficient charge in the battery to provide 130 to 150 amps at 9.6 to 11 volts so that the four cylinder engine of the connected vehicle may be started after downloading and installing the monitor module without charge from an external source (e.g., jumper cables) being provided to the battery of the connected vehicle. The connected vehicle may install the monitor module during a boot time.

In some implementations, the vehicle system may include a virtual machine. The virtual machine may install the monitor module in the vehicle application. Installation of the monitor module in the vehicle application may modify the object code of the vehicle application based on the monitor module. For example, the object code of the vehicle application may include the monitor module. In this way, the monitor module may provide a software patch for the vehicle application according to some implementations.

In some implementations, modifying the object code of the vehicle application may instrument the monitor module in the vehicle application or implement the software patch for the vehicle application.

In some implementations, modifying the object code of the vehicle application based on the monitor module may modify the behavior of the vehicle application, correct a vulnerability present in the vehicle application, correct a software bug present in the vehicle application or otherwise modify the functionality of the vehicle application. In this way, the monitor module may be a software patch for the vehicle application according to some implementations.

In some implementations, modifying the behavior of the vehicle application may include correcting the behavior of the vehicle application so that the vehicle application behaves in accordance with a specification for the vehicle application.

In some implementations, the monitor module may be generated by a computer device executing an RV-Monitor application (or any runtime verification and monitoring application derived therefrom) produced and distributed by Runtime Verification Inc. of Urbana, Ill. The monitor module may include a runtime monitoring software. The computer device may be operated by a human user. The human user may include a design engineer. The design engineer may use the computer device to generate the monitor module.

In some implementations, the computer device may include a monitoring server. The monitoring server may be operated by a manufacturer of the connected vehicle or an original equipment manufacturer (herein "OEM") of the vehicle system or the vehicle application.

In some implementations, the monitoring server may store the RV-Monitor application, specification data describing a specification associated with the vehicle application and runtime rules data describing one or more runtime rules on a non-transitory memory. The specification may include a specification for an application programming interface (herein "API") of the vehicle system. The one or more runtime rules may describe desired behavior of the vehicle application. The specification data and the runtime rules data may be an optional feature of the monitoring server.

The monitoring server may include a processor. In some implementations, the RV-Monitor application may receive the specification as an input and output the one or more runtime rules as an output upon being executed by the processor.

In some implementations, the RV-Monitor application may receive one or more of the following as an input and output the monitor data describing the monitor module upon being executed by the processor of the monitoring server: the runtime rules data describing the expected behavior of the vehicle application; trace data describing the observed behavior of the vehicle application; and user input data describing user input received from a human to configure or design the monitor module. See, e.g., FIG. 5.

For example, the RV-Monitor application may receive user input data describing user input provided by a design engineer. The user input data may include instructions for configuring the monitor module. The RV-Monitor application may output the monitor data describing the monitor module based on the user input data. The monitor module may be operable to configure the vehicle application so that the observed behavior of the vehicle application conforms to the desired behavior of the vehicle application as specified by the user input data. In this way, the RV-Monitor application may generate the monitor module without need of the runtime rules data or the trace data.

In another example, the RV-Monitor application may receive trace data describing the observed behavior of the vehicle application as an input. For example, the connected vehicle may periodically transmit the trace data to the monitoring server. The RV-Monitor application may also receive the runtime rules data describing the expected behavior of the vehicle application as an input. Optionally, the RV-Monitor application may also receive user input data describing user instructions or selections for configuring the monitor module. The RV-Monitor application may output the monitor data describing the monitor module. The monitor module may be operable to configure the vehicle application so that the observed behavior of the vehicle application conforms to the desired behavior of the vehicle application as specified by the runtime rules data generated based on the specification for the API of the vehicle system which includes the vehicle application. In this way, the RV-Monitor application may generate the monitor module based at least in part on the runtime rules data and the trace data.

Other examples are possible for the RV-Monitor application to generate the monitor module.

In some implementations, the monitoring server may be communicatively coupled to the wireless network. The monitoring server may include network communication hardware that enables the monitoring server to send data to the wireless network and receive data from the wireless network. The connected vehicle may be communicatively coupled to the wireless network and operable to send data to the wireless network and receive data from the wireless network. The monitoring server may transmit monitor data describing the monitor module to the connected vehicle via the wireless network. Example implementations of the monitor module will now be described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a connected vehicle, a monitor module via a wireless network while the connected vehicle is powered off; and installing the monitor module in a vehicle application so that an object code of the vehicle application is modified to include the monitor module; where the monitor module includes a software patch that is operable to correct an error that is present in the vehicle application; where the monitor module is generated by a RV-Monitor application present on a computing device that is communicatively coupled to the wireless network; where the vehicle application is an element of the connected vehicle that includes a combustion engine and a battery; and where the monitor module is written in an aspect language so that the connected vehicle receives the monitor module from the wireless network while also leaving a sufficient charge in the battery to start the combustion engine. An example of a sufficient charge may include 100 to 450 amps at 9 to 11 volts. Another example of a sufficient charge may include substantially 100 to substantially 450 amps at substantially 10 volts. For example, a four-cylinder engine may require 130 to 150 amps at 9.6 to 11 volts; the size of the monitor module may be configured so that it may be downloaded and installed in the connected vehicle while leaving sufficient charge in the battery to provide 130 to 150 amps at 9.6 to 11 volts so that the four cylinder engine of the connected vehicle may be started after downloading and installing the monitor module without charge from an external source (e.g., jumper cables) being provided to the battery of the connected vehicle. Other embodiments of this aspect include corresponding computer systems, apparatus, and computer programs recorded on one or more computer storage devices, each configured to perform the actions of the methods.

One general aspect includes a method including: receiving, by a connected vehicle, monitor data that describes a monitor module via a wireless network, where the monitor module includes a software patch that is operable to correct an error that is present in a vehicle application that is installed in the connected vehicle and the monitor module is written in an aspect language; and installing the monitor module in the vehicle application so that an object code of the vehicle application is modified to include the monitor module. Other embodiments of this aspect include corresponding computer systems, apparatus, and computer programs recorded on one or more computer storage devices, each configured to perform the actions of the methods.

Implementations may include one or more of the following features. The method where the connected vehicle includes a combustion engine and a battery. The method where the monitor module is written in the aspect language so that the connected vehicle receives the monitor data from the wireless network while also leaving a sufficient charge in the battery to start the combustion engine. An example of a sufficient charge may include 100 to 450 amps at 9 to 11 volts. Another example of a sufficient charge may include substantially 100 to substantially 450 amps at substantially 10 volts. For example, a four-cylinder engine may require 130 to 150 amps at 9.6 to 11 volts. The method where the monitor module is generated by a RV-Monitor application present on a computing device that is communicatively coupled to the wireless network. The method where the monitor data that describes the monitor module is received from the wireless network while the connected vehicle is powered off. The method where the monitor data that describes the monitor module is received from the wireless network while a battery of the connected vehicle is not being charged. The method where receiving the monitor module includes downloading monitor data that describes the monitor module from the wireless network. The method where the monitor module is installed in the vehicle application by a virtual machine. The method where the virtual machine is a Java virtual machine. The method where the monitor module includes code and routines that is operable to create trace data describing an operation of the vehicle application upon the vehicle application being executed by a processor of the connected vehicle. The method where trace data describes a trace log. The method where the processor is an element of an onboard computer of the connected vehicle. Implementations of the described techniques may include hardware, a method or process, or computer software on a computer-accessible medium.

One general aspect includes a method including: analyzing, by an RV-Monitor application that is executed by a processor of a computing device, a set of runtime rules for a vehicle application to generate a monitor module for the vehicle application, where the set of runtime rules describes desired behavior of the vehicle application and the monitor module is written in an aspect language and includes a software patch that is operable to cause observed behavior of the vehicle application to conform to the desired behavior of the vehicle application; and distributing monitor data describing the monitor module to a connected vehicle via a wireless network. Other embodiments of this aspect include corresponding computer systems, apparatus, and computer programs recorded on one or more computer storage devices, each configured to perform the actions of the methods.

Implementations may include one or more of the following features. The method where the connected vehicle receives the monitor data that describes the monitor module from the wireless network. The method where the connected vehicle receives the monitor data while a combustion engine of the connected vehicle is not running. The method where the connected vehicle receives the monitor data while a battery of the connected vehicle is not being charged. The method where the vehicle application is written in a Java language. The method where the vehicle application is written in a C language. Implementations of the described techniques may include hardware, a method or process, or computer software on a computer-accessible medium.

One general aspect includes a method including: receiving, by a wireless antenna of a connected vehicle, digital data that describes a runtime monitoring software that is operable to patch a vehicle application stored in a non-transitory memory of the connected vehicle; where the runtime monitoring software is operable to be installed in the vehicle application by modifying object code of the vehicle application; where the runtime monitoring software is written in an aspect language. Other embodiments of this aspect include corresponding computer systems, apparatus, and computer programs recorded on one or more computer storage devices, each configured to perform the actions of the methods.

Implementations may include one or more of the following features. The method where installation of the runtime monitoring software in the vehicle application corrects an error present in the vehicle application. Implementations of the described techniques may include hardware, a method or process, or computer software on a computer-accessible medium.

One general aspect includes a method including: analyzing, by runtime monitoring software that is executed by a processor of a computing device, a specification of a vehicle application to generate a runtime monitoring software for the vehicle application, where the runtime monitoring software is written in an aspect language and includes a software patch that is operable to modify object code for the vehicle application based on the specification; and transmitting digital data describing the runtime monitoring software to a connected vehicle via a wireless network. Other embodiments of this aspect include corresponding computer systems, apparatus, and computer programs recorded on one or more computer storage devices, each configured to perform the actions of the methods.

Implementations may include one or more of the following features. The method where the connected vehicle installs the runtime monitoring software in the vehicle application. The method where installation of the runtime monitoring software in the vehicle application modifies object code for the vehicle application. The method where modification of the object code corrects an error present in the object code for the vehicle application so that execution of the vehicle application by an onboard computer of the connected vehicle causes the vehicle application to behave in conformity with the specification of the vehicle application. Implementations of the described techniques may include hardware, a method or process, or computer software on a computer-accessible medium.

One general aspect includes a connected vehicle including: a processor; an engine; a battery; a non-transitory memory storing a vehicle application; and a wireless antenna that is powered by the battery and operable to receive a monitor module from a wireless network while the battery is not being charged; where the processor is communicatively coupled to the battery, the wireless antenna and the non-transitory memory; where the monitor module is written in an aspect language and includes a software patch for the vehicle application; where the wireless antenna receives the monitor module from the wireless network while leaving a sufficient charge in the battery to enable the battery to start the engine; and where the processor installs the monitor module in the vehicle application stored in the non-transitory memory and the installation provides the software patch for the vehicle application. Other embodiments of this aspect include corresponding computer systems, apparatus, and computer programs recorded on one or more computer storage devices, each configured to perform the actions of the methods.

Implementations may include one or more of the following features. The connected vehicle where the monitor module further includes a runtime monitoring software that is operable to be executed by the processor to create a trace log describing a behavior of the vehicle application responsive to the vehicle application being executed by the processor. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Example System Overview

Figure 1:
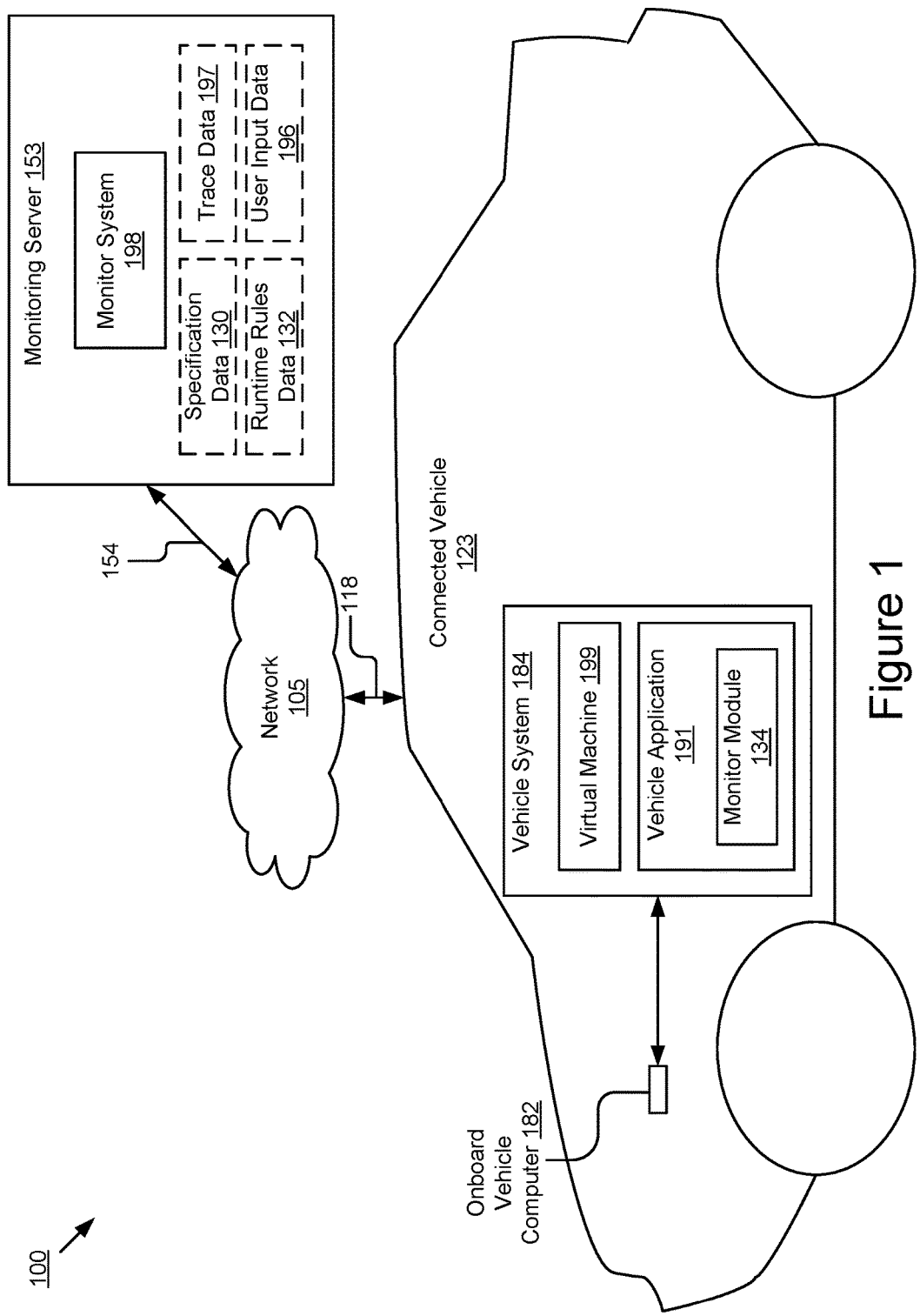
FIG. 1 is a block diagram illustrating an example operating environment for a monitor system to provide a monitor module to a connected vehicle.

FIG. 1 is a block diagram illustrating an example operating environment 100 for a monitor system 198 to provide a monitor module 134 to a connected vehicle 123. The operating environment 100 as depicted includes the connected vehicle 123 and a monitoring server 153. In the illustrated embodiment, these entities of the operating environment 100 may be communicatively coupled via a network 105.

The connected vehicle 123 and the monitoring server 153 can be used by way of example. While FIG. 1 illustrates one connected vehicle 123 and one monitoring server 153, the disclosure applies to a system architecture having one or more connected vehicles 123 and one or more monitoring server 153. Furthermore, although FIG. 1 illustrates one network 105 coupled to the connected vehicle 123 and the monitoring server 153, in practice one or more networks 105 can be connected to these entities. In some embodiments, FIG. 1 may include one or more monitor modules 134.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks or a cellular communications network for sending and receiving data via short messaging service (SMS), multimedia messaging service (MMS), hypertext transfer protocol (HTTP), direct data connection, WAP, e-mail, etc. The network 105 may be a mobile data network such as 3G, 4G, LTE, Voice-over-LTE ("VoLTE"), or any other mobile data network or combination of mobile data networks.

The monitoring server 153 can be a hardware server that includes a processor, a memory and network communication capabilities. In the illustrated example, the monitoring server 153 is coupled to the network 105 via signal line 154. The monitoring server 153 may send and receive data via the network 105. For example, the monitoring server 153 may transmit the monitor module 134 to the connected vehicle 123 via the network 105.

The monitoring server 153 may store one or more of the following elements on the non-transitory memory: a monitor system 198; specification data 130; runtime rules data 132; trace data 197; and user input data 196. The processor of the monitoring server 153 may access and execute the elements stored on the non-transitory memory.

In some implementations, the monitoring server 153 may be operated by a manufacturer of the connected vehicle 123 or an OEM of the vehicle system 184 or the vehicle application 191.

The following elements are depicted with a dashed line in FIG. 1 to indicate that they are optional features of the monitoring server 153: the specification data 130; the runtime rules data 132; the trace data 197; and the user input data 196.

The specification data 130 may include digital data that describes an API for the vehicle system 184. The runtime rules data 132 may include digital data that describes the desired behavior of the vehicle application 191 responsive to being executed by the onboard vehicle computer 182 (or a processor of the vehicle system 184). The trace data 197 may describe the observed behavior of the vehicle application 191 responsive to being executed by the onboard vehicle computer 182 (or a processor of the vehicle system 184). The user input data 196 may describe one or more user inputs to the monitoring server 153 provided by a human user of the monitor system 198. The monitor system 198 may include code and routines operable to generate monitor data describing the monitor module 134. The human user may include a design engineer that uses the monitor system 198 to generate the monitor module 134. The user inputs described by the user input data 196 may be operable to configure the monitor module 134. For example, the user inputs described by the user input data 196 may cause the monitor system 198 to configure the monitor module 134 based on a design of the design engineer that is described by the user input data 196.

In some implementations, the runtime rules data 132 may describe one or more runtime rules. The one or more runtime rules may describe the desired behavior of the vehicle application 191 after being executed by a processor of the connected vehicle 123. For example, the one or more runtime rules may describe one or more desired parameters for the vehicle application 191. The monitor system 198 may include a RV-Monitor application. The RV-Monitor application included in the monitor system 198 may include a RV-Monitor application (or any runtime verification and monitoring application derived therefrom) produced and distributed by Runtime Verification Inc. of Urbana, Ill. The RV-Monitor application may include code and routines operable to determine or configure the one or more runtime rules so that compliance with the one or more runtime rules corresponds to compliance with the specification of the API for the vehicle system 184. The specification of the API for the vehicle system 184 may be described by the specification data 130.

In some implementations, the human user may provide the user inputs to the monitor system 198 to configure a software patch for the vehicle application 191. The software patch may be included in the monitor module 134. For example, the monitor module 134 may itself be the software patch configured by the monitor system 198 based on the user input data 196.

The monitor system 198 may generate the monitor data describing the monitor module 134 based on one or more of the following elements of the monitoring server 153: the specification data 130; the runtime rules data 132; the trace data 197; and the user input data 196.

In some implementations, the monitor system 198 may receive one or more of the following as an input and output the monitor data describing the monitor module 134 upon being executed by the processor of the monitoring server 153: the runtime rules data 132 describing the expected behavior of the vehicle application 191; trace data 197 describing the observed behavior of the vehicle application 191; and user input data 196 describing user input received from a human to configure or design the monitor module 134. See, e.g., FIG. 5.

For example, the monitor system 198 may receive user input data 196 describing user input provided by a design engineer. The user input data 196 may include instructions for configuring the monitor module 134. The monitor system 198 may output the monitor data describing the monitor module 134 based on the user input data 196. The monitor module 134 may be operable to configure the vehicle application 191 so that the observed behavior of the vehicle application 191 conforms to the desired behavior of the vehicle application 191 as specified by the user input data 196. In this way, the monitor system 198 may generate the monitor module 134 without need of the runtime rules data 132 or the trace data 197.

In another example, the monitor system 198 may receive trace data 197 describing the observed behavior of the vehicle application 191 as an input. For example, the connected vehicle 123 may periodically transmit the trace data 197 to the monitoring server 153. The monitor system 198 may also receive the runtime rules data 132 describing the expected behavior of the vehicle application 191 as an input. Optionally, the monitor system 198 may also receive user input data 196 describing user instructions or selections for configuring the monitor module 134. The monitor system 198 may output the monitor data describing the monitor module 134. The monitor module 134 may be operable to configure the vehicle application 191 so that the observed behavior of the vehicle application 191 conforms to the desired behavior of the vehicle application 191 as specified by the runtime rules data 132 generated based on the specification for the API of the vehicle system 184 which includes the vehicle application 191. In this way, the monitor system 198 may generate the monitor module 134 based at least in part on the runtime rules data 132 and the trace data 197.

The examples provided above for the monitor system 198 generating the monitor module 134 are intended to be illustrative. Other examples are possible.

The monitoring server 153 may transmit the monitor data describing the monitor module 134 to the connected vehicle 123 via the network 105.

In some implementations, some elements of the monitor system 198 may reside on the monitoring server 153 and some elements of the monitor system 198 may reside on the connected vehicle 123. In some implementations, a first monitor system 198 may reside on the monitoring server 153 while a second monitor system 198 may reside on the connected vehicle 123. In some implementations, the monitoring server 153 includes a first monitor system 198, the vehicle 123 includes a second monitor system 198 and some of the functionality of the monitor system 198 is provided by the monitoring server 153 while some of the functionality of the monitor system 198 is provided by the connected vehicle 123.

In some implementations, the monitor system 198 can be implemented using hardware including a field-programmable gate array ("FPGA") or an application-specific integrated circuit ("ASIC"). In some other implementations, the monitor system 198 can be implemented using a combination of hardware and software. The monitor system 198 may be stored in a combination of the devices and servers, or in one of the devices or servers.

The monitor system 198 will be described in more detail below with reference to FIG. 3.

In some embodiments, one or more of the following elements may be included in the connected vehicle 123: the vehicle system 184; the onboard vehicle computer 182; the virtual machine 199; the vehicle application 191; the monitor module 134. These elements will be described below with reference to the connected vehicle 123.

The connected vehicle 123 may include an automobile, a bus, an airplane, a boat, or other vehicular conveyance. The connected vehicle 123 may be an electric vehicle, a hybrid vehicle or a vehicle that only includes an internal combustion engine. In some implementations, the connected vehicle 123 may include an autonomous vehicle or a semi-autonomous connected vehicle 123. In some implementations, the connected vehicle 123 may include a semi-autonomous connected vehicle 123 in which the connected vehicle 123 controls at least part of the steering functionality of the connected vehicle 123. In the illustrated example, the connected vehicle 123 is communicatively coupled to the network 105 via signal line 118.

The onboard vehicle computer 182 may include a memory and a processor. The onboard vehicle computer 182 may include a special-purpose computing device. The onboard vehicle computer 182 may be communicatively coupled to the vehicle system 184. The onboard vehicle computer 182 may execute one or more blocks of the method 400 described below with reference to FIG. 4. The onboard vehicle computer 182 may control performance of one or more of the following elements: the vehicle system 184; the virtual machine 199; the vehicle application 191; and the monitor module 134.

The vehicle system 184 may include any system of a connected vehicle 123 that includes a vehicle application 191. The vehicle application 191 may include a software application that provides some or all of the functionality of the vehicle system 184. The vehicle system 184 may include one or more of the following components of the connected vehicle 123: an infotainment system; a navigation system; an advanced driver assistance system; an engine control unit; and a system for enabling the connected vehicle 123 to be automated or semi-automated.

In some implementations, the vehicle system 184 may include any system of the connected vehicle 123 that includes a software component. The vehicle application 191 may include the software component for the vehicle system 184.

The vehicle system 184 may include one or more of the following elements: a processor; a non-transitory memory; and a communication unit for sending data to the network 105 and receiving data from the network 105.

The virtual machine 199 may include software for providing a virtual machine. The virtual machine 199 may be executed by a processor of the onboard vehicle computer 182 or a processor of the vehicle system 184. In some implementations, the virtual machine 199 may include a Java virtual machine.

In some implementations, the virtual machine 199 may be operable to install the monitor module 134 in the vehicle application 191. For example, the virtual machine 199 may execute the monitor data that describes the monitor module 134.

In some implementations, the monitor data may be configured so that the first execution of the monitor data initiates a process for installing the monitor module 134 in the vehicle application 191. The installation of the monitor module 134 may be targeted to the vehicle application 191 so that the first execution of the monitor module 134 causes the monitor module 134 to be installed in the vehicle application 191 and not some other application present in the connected vehicle 123. The virtual machine 199 may update the object code of the vehicle application 191 to include the monitor data that describes the monitor module 134. The virtual machine 199 may restart the vehicle system 184. In some implementations, restarting the vehicle system 184 after updating the object code of the vehicle application 191 to include the monitor data that describes the monitor module 134 may complete the installation of the monitor module 134 in the vehicle application 191.

In some implementations, the monitor module 134 may include a software patch for the vehicle application 191 so that installing the monitor module 134 in the vehicle application 191 installs the software patch in the vehicle application 191.

In some implementations, installing the monitor module 134 in the vehicle application 191 modifies the behavior of the vehicle application 191 so that the vehicle application 191, responsive to being executed by a processor of the onboard vehicle computer 182 (or the vehicle system 184), behaves in a way that conforms to a desired behavior of the vehicle application 191 as defined by one or more of the runtime rules data 132 or the user input data 196.

In some implementations, the virtual machine 199 may instrument the monitor module 134 in the vehicle application 191.

In some implementations, the vehicle application 191 may be executed by a processor of the vehicle system 184 (or the onboard vehicle computer 182). Execution of the vehicle application 191 may result in one or more measurable parameters corresponding to the observable behavior of the vehicle application 191. The measurable parameters may include, for example, processes being called, portions of the API of the vehicle system 184 being accessed, data being written to a memory of the vehicle system 184 and runtime errors such as buffer overflow events, compiler errors, etc.

In some implementations, the monitor system may include an RV-Monitor application. The RV-Monitor application may include code and routines configured to generate and configure the monitor module 134 so that the monitor module 134 measures the measurable parameters resulting from execution of the vehicle application 191. In this way, the monitor module 134 may observe the behavior of the vehicle application 191. Accordingly, the monitor module 134 may include two example benefits: (1) providing a software patch for the vehicle application 191 and (2) observing the behavior of the vehicle application 191. The monitor module 134 may record feedback data describing the behavior of the vehicle application 191. The monitor module 134 may cause this feedback data to be transmitted to the monitoring server 153 via the network 105.

Optionally, the virtual machine 199 or the vehicle system 184 may include a JavaMOP application which, responsive to being executed by a processor of the onboard vehicle computer 182 (or the vehicle system 184), instruments the vehicle application 191 so that the vehicle application 191 includes the monitor module 134. An example of the JavaMOP application and the monitor module 134 are described according to some implementations in U.S. patent application Ser. No. 14/939,625, which is incorporated herein by reference.

Example Electronic Devices

Figure 2:
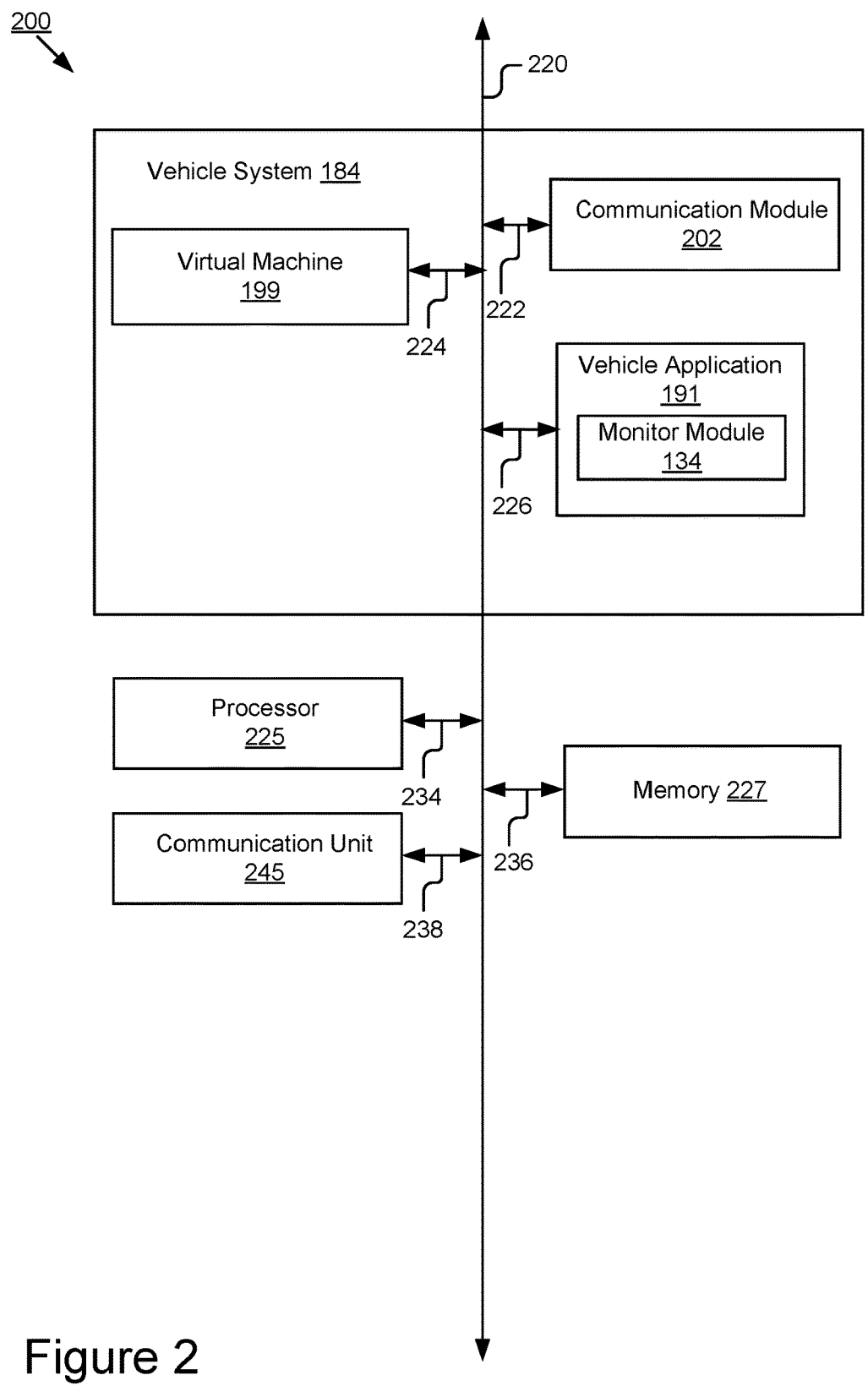
FIG. 2 is a block diagram illustrating an example computing system including a monitor module.

FIG. 2 is a block diagram illustrating an example computing system 200 (herein "the system 200") including a monitor module 134.

In some implementations, the system 200 may include an electronic device programmed or configured to perform one or more blocks of the method 400 described below with reference to FIG. 4. The system 200 may be an element of the connected vehicle 123. In some implementations, the system 200 may include a special-purpose computing device configured to provide some or all of the functionality described below with reference to method 400.

The system 200 may include the vehicle system 184, a processor 225, a memory 227 and a communication unit 245. The components of the system 200 are communicatively coupled by a bus 220. In some embodiments, the components of the system 200 are local to the same hardware so that the bus 220 is not necessary for communication among the components of the system 200. In some embodiments, communication structures or methods other than the bus 220 may be implemented.

The processor 225 is communicatively coupled to the bus 220 via signal line 234. The memory 227 is communicatively coupled to the bus 220 via the signal line 236. The communication unit 245 is communicatively coupled to the bus 220 via signal line 238. In some embodiments, one or more of the elements of the system 200 may share a signal line for communication with the bus 220.

The memory 227 is a tangible storage medium that stores instructions or data that may be accessed and executed by the processor 225. The instructions or data may include code for performing the techniques described herein. The memory 227 may include a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. The processor 225 may include a graphical processing unit. Other processors, operating systems, sensors, displays, and physical configurations may be possible.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

In some implementations, the monitor system 198 includes one or more of the following elements: a communication module 202; the virtual machine 199; and the vehicle application 191. The vehicle application 191 includes the monitor module 134. For example, the communication unit 245 may have received the monitor module 134 from the network 105 and the virtual machine 199 may have installed the monitor module 134 in the vehicle application 191 during a boot time as described below with reference to method 400 of FIG. 4.

The communication module 202 is communicatively coupled to the bus 220 via a signal line 222. The virtual machine 199 is communicatively coupled to the bus 220 via a signal line 224. The vehicle application 191 is communicatively coupled to the bus 220 via a signal line 226.

In some implementations, one or more of the virtual machine 199, the vehicle application 191 and the monitor module 134 can be stored in the memory 227 of the system 200 and can be accessible and executable by the processor 225. The virtual machine 199, the vehicle application 191 and the monitor module 134 are described above with reference to FIG. 1, and so, those descriptions will not be repeated here.

The communication module 202 may include code and routines configured to handle communications between the vehicle system 184 and other components of the system 200. In some implementations, the communication module 202 can include a set of instructions executable by the processor 225 to provide the functionality described below for handling communications between the vehicle system 184 and other components of the system 200. In some implementations, the communication module 202 can be stored in the memory 227 of the system 200 and can be accessible and executable by the processor 225.

The communication module 202 sends and receives data, via the communication unit 245, to and from the network 105. For example, the communication module 202 receives, via the communication unit 245, monitor data describing the monitor module 134 from the network 105.

In some implementations, the communication module 202 receives data from components of the system 200 and stores the data in the memory 227.

Figure 3:
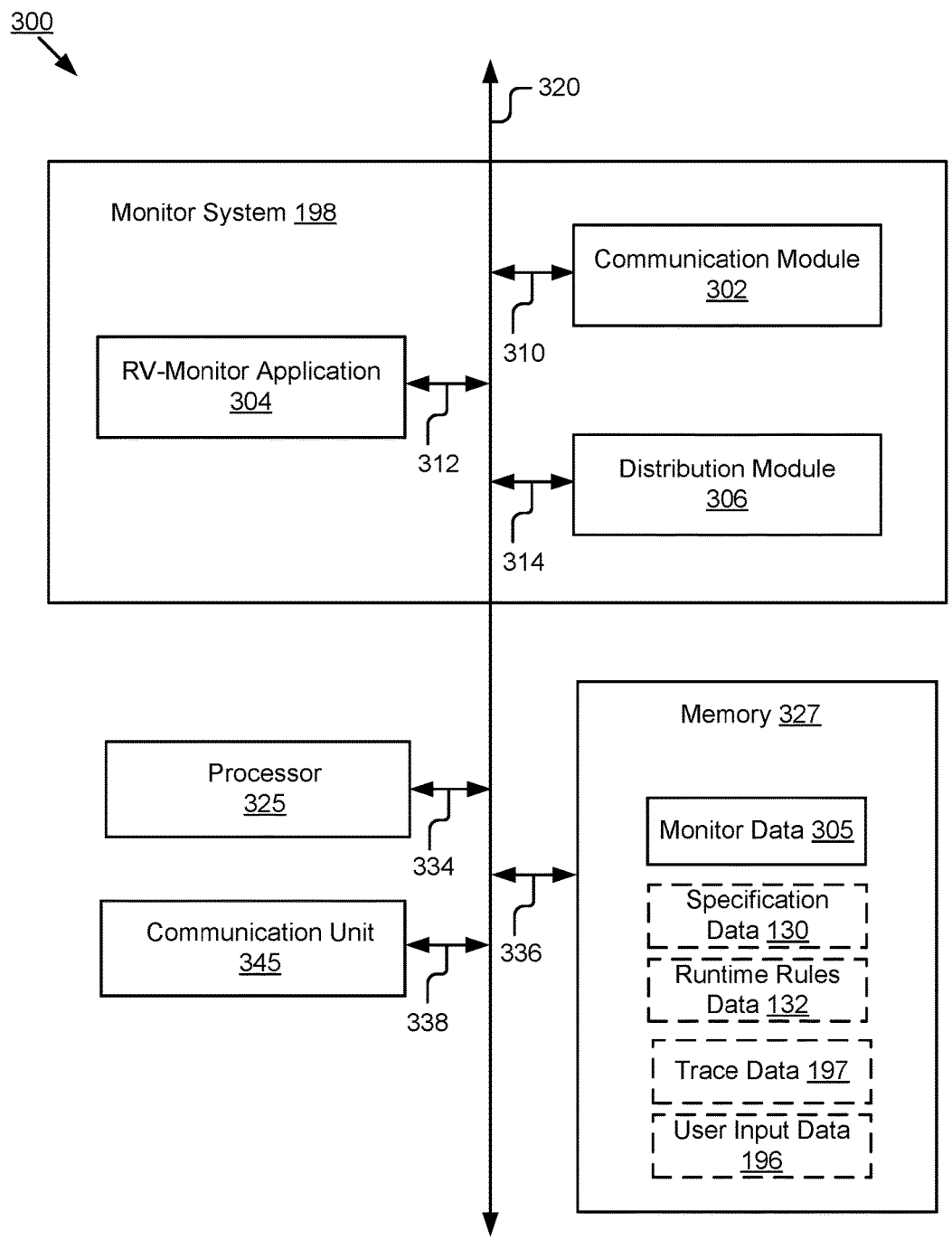
FIG. 3 is a block diagram illustrating an example computing system for generating the monitor module

Referring now to FIG. 3, depicted is an example computing system 300 (herein "the system 300") for generating the monitor module 134 described by the monitor data 305. The system 300 may be an element of the monitor server 153.

In some implementations, the system 300 may include a special-purpose computing device configured to provide some or all of the functionality described herein. The system 300 may include a special-purpose computing device configured to generate the monitor data 305.

The system 300 may include the monitor system 198, a processor 325, a memory 327 and a communication unit 345. The components of the system 300 are communicatively coupled by a bus 320. In some embodiments, the components of the system 300 are local to the same hardware so that the bus 320 is not necessary for communication among the components of the system 300. In some embodiments, communication structures or methods other than the bus 320 may be implemented.

The processor 325 is communicatively coupled to the bus 320 via signal line 334. The memory 327 is communicatively coupled to the bus 320 via the signal line 336. The communication unit 345 is communicatively coupled to the bus 320 via signal line 338. In some embodiments, one or more of the elements of the system 300 may share a signal line for communication with the bus 320.

The processor 325, the communication unit 345 and the memory 327 include similar functionality as the processor 225, the communication unit 245 and the memory described above with reference to FIG. 2, respectively, and so, those descriptions will not be repeated here.

The memory 327 may include one or more of the following elements: the monitor data 305; the specification data 130; the runtime rules data 132; the trace data 197; and the user input data 196.

The following elements of the memory 327 were described above with reference to FIG. 1, and so, those descriptions will not be repeated here: the specification data 130; the runtime rules data 132; the trace data 197; and the user input data 196. These elements of the memory 327 are depicted with a dashed line in FIG. 3 to indicate that they are optional features of the system 300.

The monitor data 305 may include digital data that describes the monitor module 134. The monitor data 305 may be written in an aspect language.

In some implementations, the monitor system 198 includes one or more of the following: a communication module 302; an RV-Monitor application 304; and a distribution module 306.

The communication module 302 is communicatively coupled to the bus 320 via a signal line 310. The RV-Monitor application 304 is communicatively coupled to the bus 320 via a signal line 312. The distribution module 306 is communicatively coupled to the bus 320 via a signal line 314.

The communication module 302 may include code and routines configured to handle communications between the monitor system 198 and other components of the system 300. In some implementations, the communication module 302 can include a set of instructions executable by the processor 325 to provide the functionality described below for handling communications between the monitor system 198 and other components of the system 300. In some implementations, the communication module 302 can be stored in the memory 327 of the system 300 and can be accessible and executable by the processor 325.

The communication module 302 sends and receives data, via the communication unit 345, to and from the network 105. For example, the communication module 302 receives, via the communication unit 345, the trace data 197 from the network 105.

In some implementations, the communication module 302 receives data from components of the system 300 and stores the data in the memory 327.

The RV-Monitor application 304 may include code and routines that generate one or more of the monitor data 305 and the runtime rules data 132.

In some implementations, the RV-Monitor application 304 may include an RV-Monitor application (or any runtime verification and monitoring application derived therefrom) produced and distributed by Runtime Verification Inc. of Urbana, Ill. The system 300 may be operated by a human user. The human user may include a design engineer. The design engineer may use the system 300 to generate the monitor data 305.

In some implementations, the RV-Monitor application 304 may receive the specification data 130 as an input and output the runtime rules data 132 upon being executed by the processor 325. The RV-Monitor application 304 may configure the runtime rules described by the runtime rules data 132 so that compliance with the runtime rules by the vehicle application 191 corresponds with compliance with the API for the vehicle system 184 that includes the vehicle application 191.

In some implementations, the RV-Monitor application 304 may receive one or more of the following as an input and output the monitor data 305 describing the monitor module 134 upon being executed by the processor 325: the runtime rules data 132 describing the expected behavior of the vehicle application 191; the trace data 197 describing the observed behavior of the vehicle application 191; and user input data 196 describing one or more user inputs received from a human to configure or design the monitor module 134. See, e.g., FIG. 5.

For example, the RV-Monitor application 304 may receive user input data 196 describing one or more user inputs provided by a design engineer from the communication module 302. The user input data 196 may include instructions for configuring the monitor module 134. Responsive to being executed by the processor 325, the RV-Monitor application 304 may output the monitor data 305 describing the monitor module 134 based on the user input data 196. The monitor module 134 may be operable to configure the vehicle application 191 so that the observed behavior of the vehicle application 191 responsive to being executed by a processor of the connected vehicle 123 conforms to the desired behavior of the vehicle application 191 as specified by the user input data 196. In this way, the RV-Monitor application 304 may generate the monitor data 305 that describes the monitor module 134 without need of the runtime rules data 132 or the trace data 197.

In another example, the RV-Monitor application 304 may receive the trace data 197 describing the observed behavior of the vehicle application 191 as an input. For example, the connected vehicle 123 may periodically transmit the trace data 197 to the system 300. The RV-Monitor application 304 may also receive the runtime rules data 132 describing the expected behavior of the vehicle application 191 as an input from the communication module 302. Optionally, the RV-Monitor application 304 may also receive user input data 196 from the communication module 302 describing user instructions or selections for configuring the monitor data 305. The RV-Monitor application 304 may output the monitor data 305 describing the monitor module 134. The communication module 302 may store the monitor data 305 in the memory 327. The monitor module 134 described by the monitor data 305 may be operable to configure the vehicle application 191 so that the observed behavior of the vehicle application 191 upon being executed by a processor of the connected vehicle 123 conforms to the desired behavior of the vehicle application 191 as specified by the runtime rules data 132 generated based on the specification for the API of the vehicle system 184 which includes the vehicle application 191. In this way, the RV-Monitor application 304 may generate the monitor data 305 that describes the monitor module 134 based at least in part on the runtime rules data 132 and the trace data 197.

In some implementations, the RV-Monitor application 304 can be stored in the memory 327 of the system 300 and can be accessible and executable by the processor 325.

The distribution module 306 may include code and routines configured to distribute the monitor data 305 to the connected vehicle 123 via the network 105. The distribution module 306 may receive the monitor data 305 from the RV-Monitor application 304 or the memory 327 and transmit the monitor data 305 to the communication unit 345. The communication unit 345 may transmit the monitor data 305 to the connected vehicle 123 via the network 105.

In some implementations, the distribution module 306 can be stored in the memory 327 of the system 300 and can be accessible and executable by the processor 325.

Example Method

Figure 4:
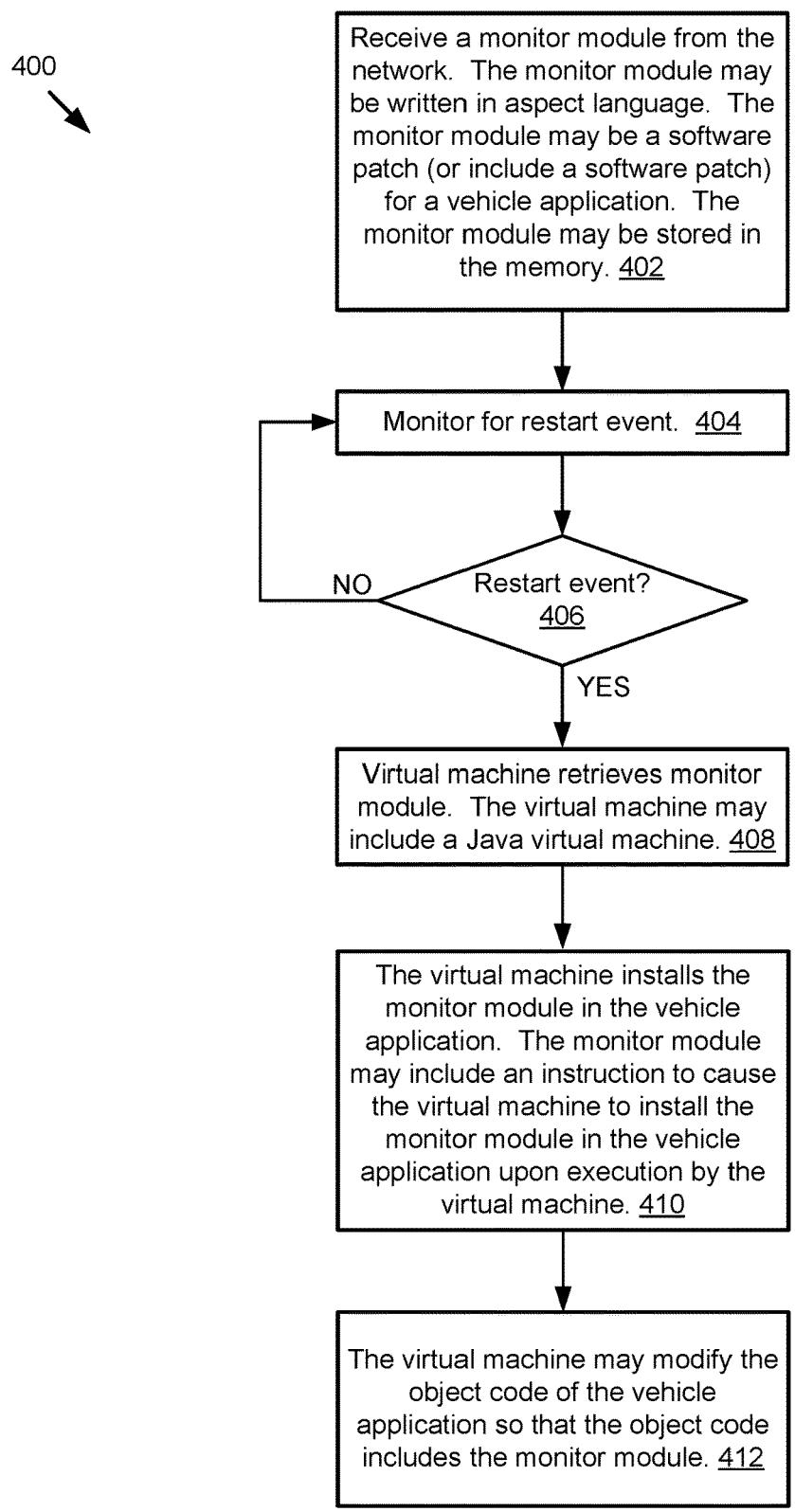
FIG. 4 is a flowchart of an example method for installing the monitor module in a vehicle application of a connected vehicle.

FIG. 4 is a flowchart of an example method 400 for installing the monitor module 134 in a vehicle application 191 of a connected vehicle 123 according to some implementations.

In some implementations, one or more blocks of the method 400 may be performed by the system 200 described above with reference to FIG. 2.

At block 402 a monitor module 134 may be received from the network 105. The monitor module 134 may be written in an aspect language. The monitor module 134 may be a software patch (or include a software patch) for the vehicle application 191. The monitor module 134 may be stored in a non-transitory memory 227.

At block 404 the method 400 may monitor for a restart event. A restart event may include an event where the vehicle application 191 is powered down, powered up and then boots up. The monitor module 134 may be installed in the vehicle application 191 during the restart event.

At block 406 a determination may be made regarding whether the restart event is detected. If a restart event is not detected at block 406, then the method 400 returns to block 404. If a restart event is detected at block 406, then the method 400 proceeds to block 408.

At block 408 the virtual machine 199 may retrieve the monitor module 134 from the memory 227. The virtual machine 199 may include a Java virtual machine or some other virtual machine.

At block 410 the virtual machine 199 may install the monitor module 134 in the vehicle application 191. For example, the virtual machine 199 may execute the monitor module 134. The monitor module 134 may include one or more instructions that cause the virtual machine to install the monitor module 134 in the vehicle application 191 upon being executed by the virtual machine 199.

At block 412 the virtual machine 199 may modify the object code of the vehicle application 191 so that the object code includes the monitor module 134.

Example Flow Process

Figure 5:
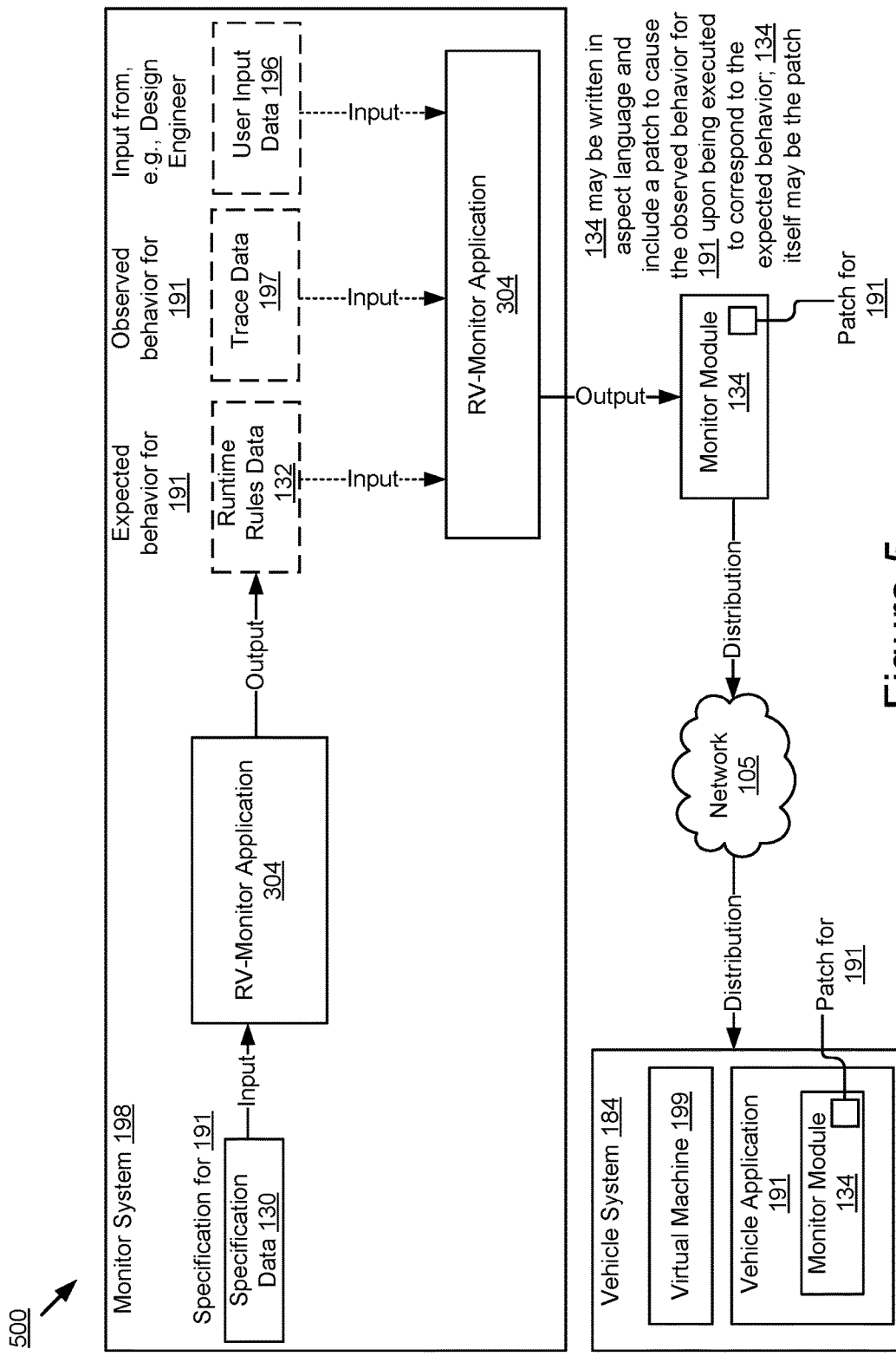
FIG. 5 is a process flow diagram of an example process for generating the monitor module and distributing the monitor module to a connected vehicle including a vehicle application via a wireless network 105.

FIG. 5 is a process flow diagram of an example process 500 for generating the monitor module 134 and distributing the monitor module 134 to a connected vehicle 123 including a vehicle application 191 via a wireless network 105.

The specification data 130 may be inputted to the RV-Monitor application 304. The RV-Monitor application 304 may output the runtime rules data 132.

One or more of the following elements may be inputted to the RV-Monitor application 304: the runtime rules data 132; the trace data 197; and the user input data 196. The RV-Monitor application 304 may output the monitor module 134. The monitor module 134 may include a software patch for the vehicle application 191. For example, the monitor module 134 may be a software patch for the vehicle application.

The monitor module 134 may be distributed to the connected vehicle 123 via the network 105. The virtual machine 199 may install the monitor module 134 in the vehicle application. For example, the virtual machine 199 may modify the object code of the vehicle application 191 to include the monitor module 134.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A method comprising:
   determining that an observed behavior of a vehicle application that is installed in a connected vehicle fails to conform to a desired behavior of the vehicle application as specified by runtime rules data, wherein the connected vehicle includes an engine and a battery;
   receiving, by the connected vehicle, a monitor module via a wireless network; and
   installing the monitor module in the vehicle application so that an object code of the vehicle application is modified to include the monitor module;
   wherein the monitor module includes a software patch that is operable to correct an error that caused the observed behavior of the vehicle application to fail to correspond to the desired behavior of the vehicle application as specified by runtime rules data;
   wherein the monitor module includes user input data describing user instructions for configuring the monitor module to generate the software patch;
   wherein the vehicle application is an element of the connected vehicle;
   wherein the monitor module is received and installed in the connected vehicle while the connected vehicle is powered off and the battery of the connected vehicle is not being charged; and
   wherein the monitor module is written in an aspect language so that the connected vehicle receives the monitor module from the wireless network while also leaving a sufficient charge in the battery to start the engine.

2. A method comprising:
   determining that an observed behavior of a vehicle application that is installed in a connected vehicle fails to conform to a desired behavior of the vehicle application as specified by runtime rules data, wherein the connected vehicle includes an engine and a battery;
   receiving, by the connected vehicle, a monitor module with monitor data that describes the monitor module via a wireless network, wherein the monitor module includes a software patch that is operable to correct an error that caused the observed behavior of the vehicle application to fail to correspond to the desired behavior, the monitor data includes user input data describing user instructions for configuring the monitor module to generate the software patch; and
   installing the monitor module in the vehicle application so that an object code of the vehicle application is modified to include the monitor module;
   wherein the monitor module with the monitor data is received and installed in the connected vehicle while the connected vehicle is powered off and the battery of the connected vehicle is not being charged; and
   wherein the monitor module is written in an aspect language so that the connected vehicle receives the monitor module with the monitor data from the wireless network while also leaving a sufficient charged in the battery to start the engine.

3. The method of claim 2, wherein the monitor module is generated by a Runtime Verification Monitor application (RV-Monitor application) present on a computing device that is communicatively coupled to the wireless network.

4. The method of claim 2, wherein receiving the monitor module includes downloading monitor data that describes the monitor module from the wireless network.

5. The method of claim 2, wherein the monitor module is installed in the vehicle application by a virtual machine.

6. The method of claim 5, wherein the virtual machine is a Java virtual machine.

7. The method of claim 2, wherein the monitor module includes code and routines that is operable to create trace data describing an operation of the vehicle application upon the vehicle application being executed by a processor of the connected vehicle.

8. The method of claim 7, wherein trace data describes a trace log.

9. The method of claim 7, wherein the processor is an element of an onboard computer of the connected vehicle.

10. A method comprising:
    analyzing a set of runtime rules for a vehicle application to generate the monitor module for the vehicle application, wherein the set of runtime rules describes desired behavior of the vehicle application;
    receiving user input data describing user instructions for configuring the monitor module to generate a software patch that is operable to correct an error that caused observed behavior of the vehicle application to fail to correspond to the desired behavior of the vehicle application;
    distributing the monitor module with monitor data describing the monitor module to a connected vehicle via a wireless network, wherein the connected vehicle includes an engine and a battery; and
    installing the monitor module in the connected vehicle to modify an object code of the vehicle application to include the monitor module so that the observed behavior of the vehicle application conforms to the desired behavior of the vehicle application;
    wherein the monitor module with the monitor data is received and installed in the connected vehicle while the connected vehicle is powered off and the battery of the connected vehicle is not being charged; and
    wherein the monitor module is written in an aspect language so that the connected vehicle receives the monitor module and the monitor data from the wireless network while also leaving a sufficient charge in the battery to start the engine.

11. The method of claim 10, wherein the connected vehicle receives the monitor data that describes the monitor module from the wireless network.

12. The method of claim 10, wherein the vehicle application is written in a Java language.

13. The method of claim 10, wherein the vehicle application is written in a C language.

14. A method comprising:
receiving, by a wireless antenna of a connected vehicle, a runtime monitoring software and digital data that describes the runtime monitoring software that is operable to patch a vehicle application stored in a non-transitory memory of the connected vehicle, wherein the runtime monitoring software includes a patch that is configured based on user input, and the connected vehicle includes an engine and a battery;
applying the patch to correct an error that caused an observed behavior of the vehicle application to fail to correspond to desired behavior of the vehicle application;
installing the runtime monitoring software in the vehicle application of the connected vehicle by modifying an object code of the vehicle application to include the runtime monitoring software in the vehicle application of the connected vehicle;
wherein the runtime monitoring software configures the vehicle application so that the observed behavior of the vehicle application conforms to the desired behavior of the vehicle application as specified by runtime rules data;
wherein the runtime monitoring software is received and installed in the vehicle application of the connected vehicle while the connected vehicle is powered off and the battery of the connected vehicle is not being charged; and
wherein the runtime monitoring software with the digital data is written in an aspect language in a file size that is configured based on an engine size of the connected vehicle so that the battery of the connected vehicle has sufficient charge to start the connected vehicle after receiving and installing the runtime monitoring software in the vehicle application.

15. A method comprising:
analyzing, by a processor of a computing device, a specification of a vehicle application to generate a runtime monitoring software for the vehicle application;
receiving user input data describing user instructions for configuring the runtime monitoring software to generate a software patch that is operable to correct an error that caused observed behavior of the vehicle application to fail to correspond to desired behavior of the vehicle application;
transmitting the runtime monitoring software with digital data describing the runtime monitoring software to a connected vehicle via a wireless network, wherein the connected vehicle includes an engine and a battery;
installing the runtime monitoring software in the connected vehicle by modifying an object code of the vehicle application to include the runtime monitoring software, wherein the runtime monitoring software modifies and configures the vehicle application so that the observed behavior of the vehicle application conforms to the desired behavior of the vehicle application as specified by runtime rules data;
wherein the runtime monitoring software with the digital data is transmitted and installed in the vehicle application of the connected vehicle while the connected vehicle is powered off and the battery of the connected vehicle is not being charged; and
wherein the runtime monitoring software with the digital data is written in an aspect language in a file size that is configured based on an engine size of the connected vehicle so that the battery of the connected vehicle has sufficient charge to start the connected vehicle after receiving and installing the runtime monitoring software in the vehicle application.

16. The method of claim 15, wherein the connected vehicle installs the runtime monitoring software in the vehicle application.

17. The method of claim 15, wherein the connected vehicle installs the runtime monitoring software during a boot time.

18. A connected vehicle comprising:
an engine;
a battery;
a non-transitory memory storing a vehicle application;
a wireless antenna that is powered by the battery and operable to receive a monitor module from a wireless network, the monitor module being configured based on user input data describing user instructions for configuring the monitor module to generate a software patch, the software patch is operable to correct an error that caused observed behavior of the vehicle application to fail to correspond to desired behavior; and
a processor installs the monitor module in the vehicle application stored in the non-transitory memory, and the monitor module provides the software patch for the vehicle application;
wherein the processor is communicatively coupled to the battery, the wireless antenna and the non-transitory memory;
wherein the wireless antenna receives a monitor module from the wireless network and the processor installs the monitor module in the vehicle application while the battery is not being charged and the engine is powered off; and
wherein the monitor module is written in an aspect language and includes the software patch
so that after the wireless antenna receives the monitor module from the wireless network and the processor installs the monitor module in the vehicle application while also leaving a sufficient charge in the battery to enable the battery to start the engine.

19. The connected vehicle of claim 18, wherein the monitor module further includes a runtime monitoring software that is operable to be executed by the processor to create a trace log describing a behavior of the vehicle application responsive to the vehicle application being executed by the processor.

* * * * *